Feb. 12, 1957  R. B. THOMPSON  2,781,133
VACUUM FILTER

Filed Jan. 5, 1954  3 Sheets-Sheet 1

INVENTOR
ROBERT B. THOMPSON.

BY Harold T. Dowell

ATTORNEY

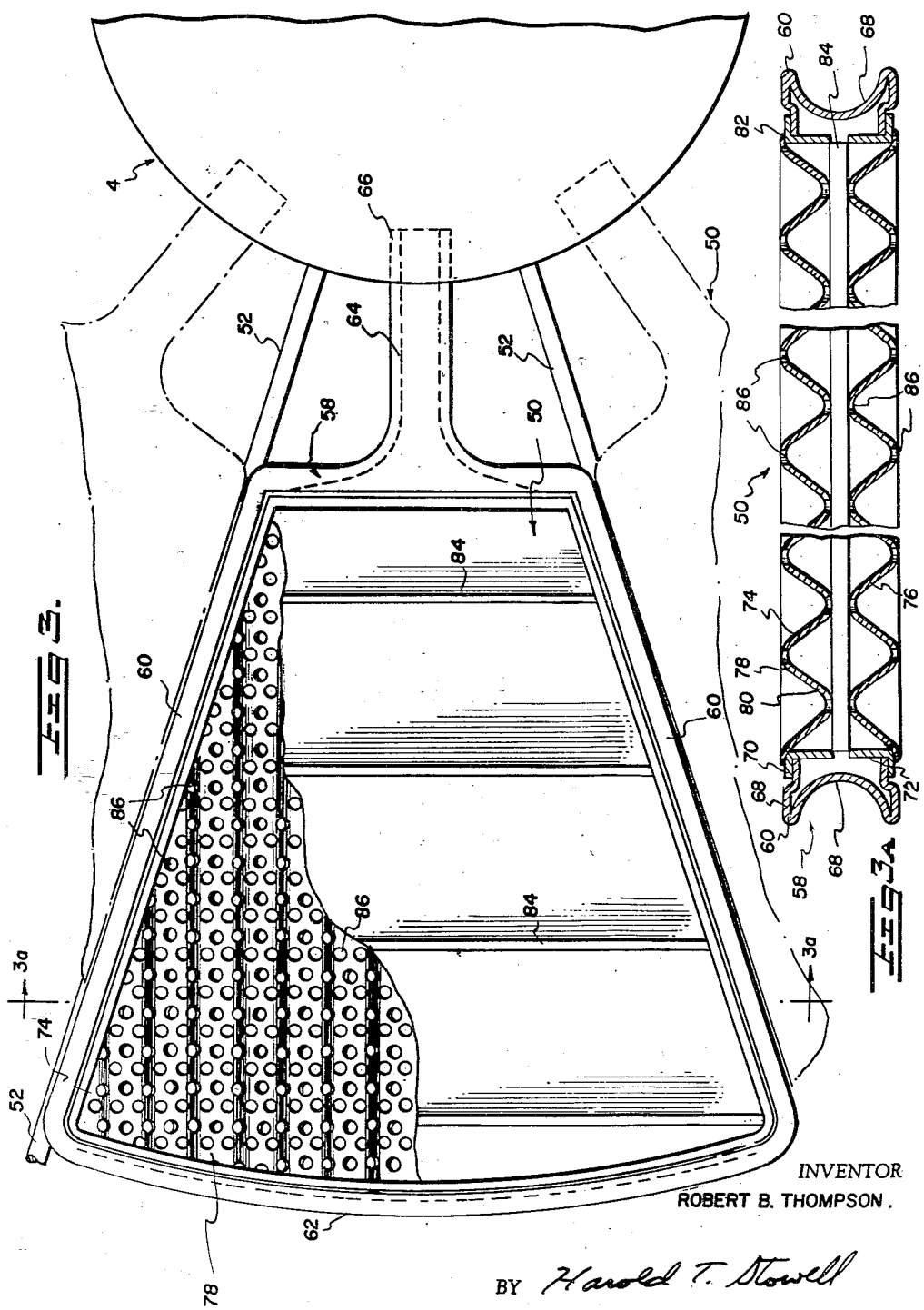

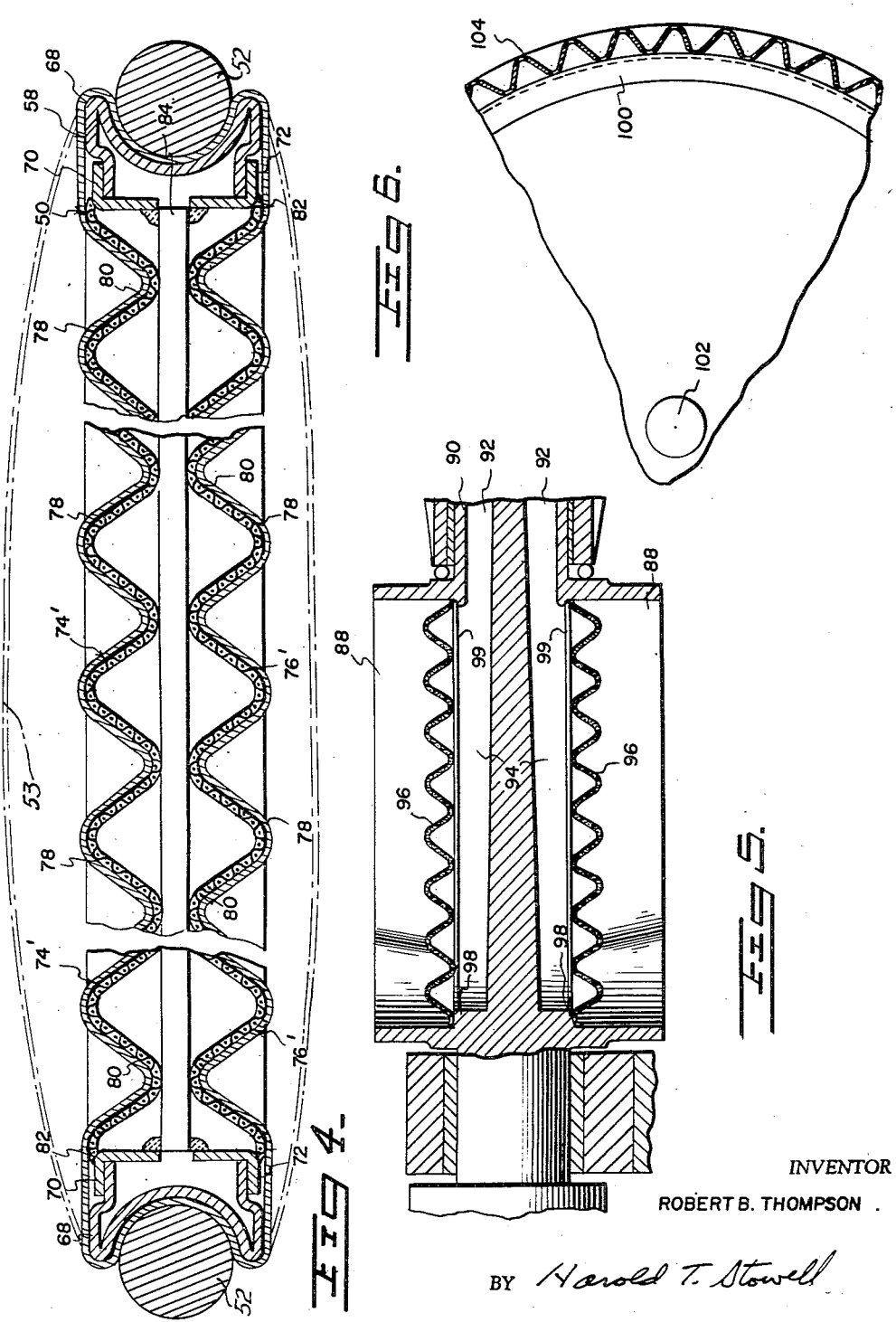

United States Patent Office 2,781,133
Patented Feb. 12, 1957

2,781,133
VACUUM FILTER

Robert B. Thompson, Salt Lake City, Utah, assignor to The Eimco Corporation, Salt Lake City, Utah, a corporation of Utah Application January 5, 1954, Serial No. 402,219

2 Claims. (Cl. 210—199)

This invention relates to vacuum filters. More particularly, it relates to improved vacuum filters having corrugated members to support filter cloths or equivalent filter webs to present corrugated filter surfaces.

Filter manufacturers and users have long recognized an existing need for improved ways to: (a) increase the filtering area of filters of any given overall dimension, (b) increase the filtering rate of existing type filters, (c) eliminate, if possible, the scrapers used to remove filter cakes in many types of filter equipment and (d) improve, in general, the method of discharge of filter cake from filters.

A principal object of the present invention is the provision of new improvements in the means used to support filter webs in vacuum filters.

Further objects include:
1. Provision of improvements which increase the active filter area for a filter of a given size.
2. Provision of improved filters from which the filter cake can be discharged without the use of scrapers.
3. Provision of a new method for the discharge of a filter cake from a filter surface.
4. Provision of improvements in filters which serve to increase the filtration rate of a given type filter.
5. Provision of filter cloth or equivalent filter web supporting elements which will support the webs to present corrugated filter surfaces of relatively large surface area and which aid in discharging filter cake formed upon the filter webs.
6. Provision of such filter web supporting elements which may be put into existing filter apparatus without requiring radical alterations to be made in the apparatus.
7. Provision of new means and methods for discharge of filter cakes from pan filters of either the single sided or double sided type, which eliminates one of the main disadvantages of this type filter, namely, poor filter cake discharge.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by providing vacuum filters with corrugated apertured members and incorporating such members in the filter so that a filter web may be supported by direct contact with the corrugated apertured members to present an undulated filter surface.

In accordance with the teachings of the invention a flexible, porous filter web is supported in direct contact with a corrugated apertured member, material to be filtered is brought into contact with the filter surface, and a vacuum is applied to the back of the filter surface through the openings in said member to form a filter cake on the web. The filter cake is removed from the filter surface by applying pressure to the back of the filter web through the openings therein, thus blowing the web out of contact with the corrugated apertured support.

A more complete understanding of the procedures and apparatus of this invention can be had by reference to the accompanying drawings, in which:

Figure 3 is a plan view, partially broken away of a filter sector for the disc filter of Figure 1 showing details of a corrugated perforate plate type support member;

Figure 3a is a section on line 3a—3a of Figure 3;

Figure 4 is an enlarged, fragmentary sectional end view of a filter sector of the type shown in Figure 3 where the support member is a screen;

Figure 5 is a sectional side view of a filter of the horizontal pan type which incorporates the improved features of this invention; and Figure 6 is a sectional end view of a rotary drum filter equipped with the features of this invention.

Figure 1:
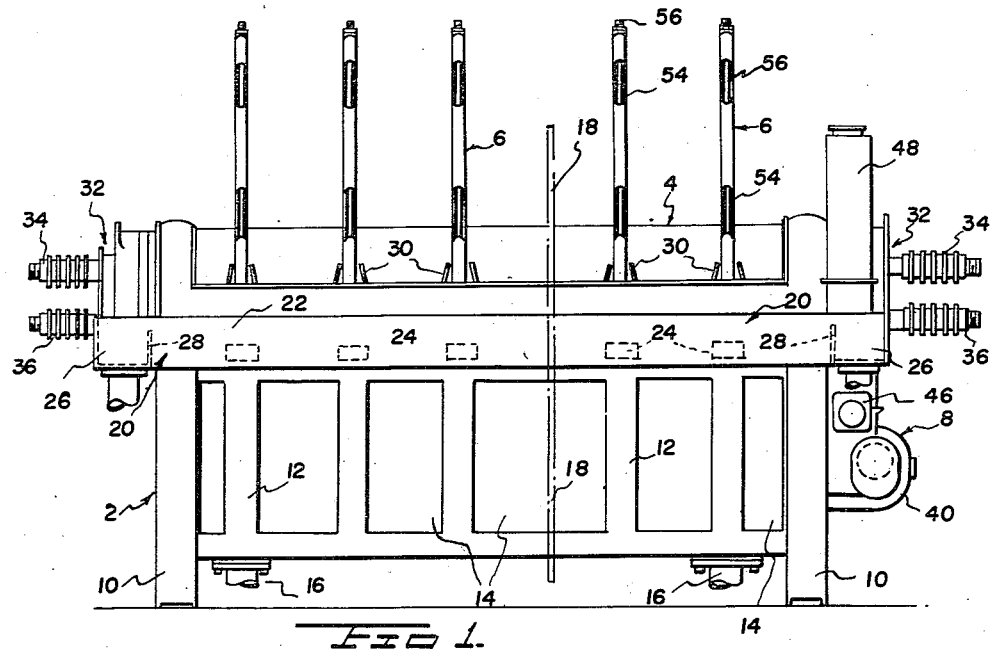
Figure 1 is a side elevational view of a disc filter incorporating the features of this invention.
Figure 2:
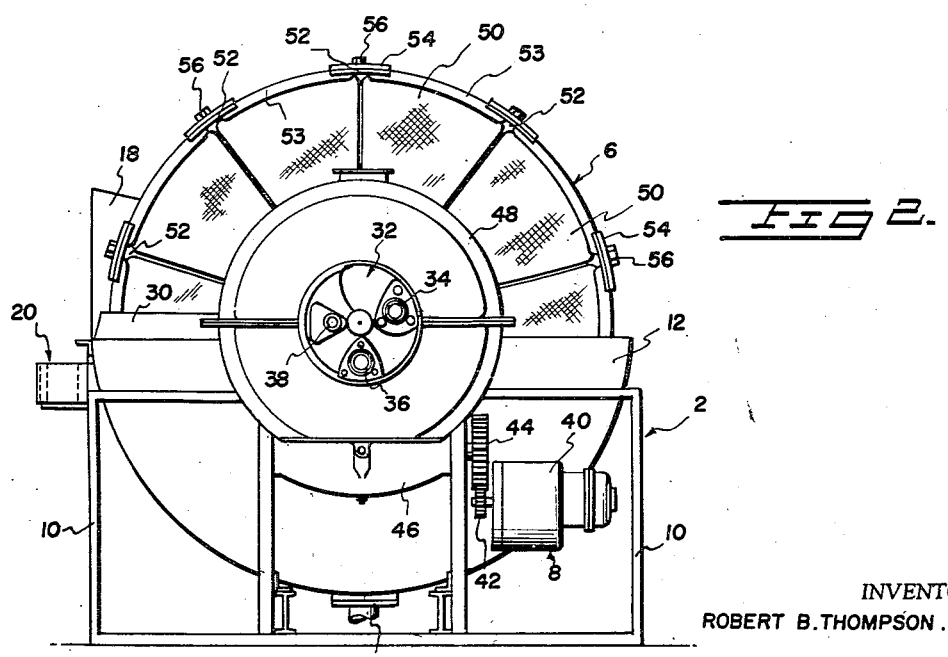
Figure 2 is an end elevational view of the disc filter of Figure 1.

Referring in detail to Figures 1 to 4 of the drawings, the disc filter basically consists of a tank member 2, central rotary shaft unit 4, filter disc members 6 and drive unit 8. Figure 1 shows the filter from the discharge side and Figure 2 shows the apparatus from the drive end.

The tank member 2 comprises supporting uprights 10, feed partitions 12, cake discharge crenelations 14, drains 16 and a partition plate 18. The partition plate divides the filter into a right and left hand unit which may be operated as separate filters or as a combined unit of large capacity.

A launder 20 is fixed on the discharge side of the tank 2 and is divided into feed section 22 provided with feed openings 24 (shown in dotted section) connected to the feed partitions 12 and feed and overflow boxes 26 adjacent the two baffles 28.

Baffle plates 30 are provided on each side of the crenelations 14 in order to channel discharged filter cake into the crenelations. These plates 30 which do not ride against the disc members 6, take the place of scrapers which are employed to remove filter cake in similar filters not having the improved features of this invention.

Each side of the filter has a double outlet valve unit 32 which automatically controls the vacuum and pressure to be applied to the disc members 6 through the central shaft unit 4. The valve units 32 include vacuum line connections 34 and 36 and blow line connections 38.

The drive unit 8 consists of a motor 40, gears 42 and 44, a worm-gear and housing 46 and drive gear and housing 48.

The filter disc members 6 comprise filter sectors 50 which are held in place by radial rods 52 and arcuate retainer members 53. Each rod is provided with a clamp 54 and nut 56 on the outer end to hold two adjacent sectors 50 in place.

The details of the filter sectors can be seen in Figure 3 and 3a wherein the arcuate members 53 are not shown in order to better illustrate the filter sector construction. Each filter sector 50 comprises a peripheral frame member 58 which is trapezoidal in shape and defined by side elements 60, arcuate end element 62 and the hollow integral stem section 64 having a connection nipple 66 by which the sectors are mounted upon the shaft unit 4. As seen in Figure 3a, the frame member 58 comprises a channel member 68 and two strengthening L-members 70 and 72 welded to the member 68. However, the frame member 58 can be cast, extruded or forged as a solid or hollow unit if desired. The frame members may be of any desired shape, e. g., rectangular, instead of trapezoidal.

In Figures 3 and 3a a pair of rigid plates 74 and 76 provided with corrugations comprising lands 78 and grooves 80 are recessed into the frame 58 and welded at their edges 82 to the frame. A plurality of reinforcing bars 84 are welded to groove faces of the plates 74 and 76 at spaced intervals to prevent the plates from bowing during operation of the filter.

The corrugations preferably run parallel to the longitudinal axis of the stem 64, as this has been discovered to give the best cake discharge. However, the corrugations may run in any other direction and do not even need to be parallel, for example, they may be fanned to correspond to the trapezoidal shape of the sector frame.

The corrugations can be made in a variety of configurations and patterns. For example, the land and grooves may be flattened to give a generally rectangular configuration. However, a sinusoidal shape as shown is preferred. The lands and grooves may be varied in size and spacing, if desired, but best results have been found to be obtained with corrugations made by lands and grooves of uniform depth and uniform spacing across the plate area. The number of lands, and in turn grooves, is not critical, but plates having about 4 to 24 lands per foot of width with a depth of ¼ to 2 inches between land and groove have been discovered to be highly satisfactory.

The shape of the openings 86 in the corrugated plates may be varied. For example, square, rectangular, hexagonal, pentagonal or like shaped holes may be used. The size of the perforations may also be varied within wide limits. Preferably, the openings 86 are of such size that their longest dimension (their diameter in the case of circular openings) is less than the horizontal distance between any groove 80 and an adjacent land 78.

Where corrugated plates are used, openings as large as ½" have been found to give very satisfactory results.

In Figure 4 of the drawing a filter sector constructed as hereinbefore described with reference to Figures 3 and 3a and provided with identical reference characters is shown, wherein the corrugated support members comprises four mesh screen generally indicated at 74' and 76' having about 2300 openings per square foot. The employment of corrugated screen support members, while generally requiring additional support ribs 84, has the advantage of eliminating blind spots opposite the solid portions of the perforated rigid plates such as shown in Figures 3 and 3a of the drawings. It has been found that screen as fine as ten mesh having about 14,400 openings per square foot may be used satisfactorily.

Throughout the specification and claims, the term "corrugated apertured support member" includes both the screens shown in Figure 4 and the rigid perforate plates shown in Figure 3 and the members may be fabricated from any suitable material, preferably sheet metal or metal wire, but plastic or equivalent structural material may be used.

The shaft unit 4 comprises a number of longitudinal conduits (not shown) which connect with the valve unit 32 and have openings extending radially to receive the nipples 66 of the sectors 50. Individual sectors are replaced or filter webs, such as filter cloth bags, are fitted upon the sectors by undoing nuts 56, withdrawing clamps 54 and pulling out the filter sector.

In operation, flexible filter webs 53 (see Fig. 4) are placed over both corrugated support members of each of the ten filter sectors in each of the five filter discs of the filter apparatus. A slurry or similar liquid mixture to be filtered is then introduced into the feed partitions 12 through launder 22. Vacuum is applied to the filter sectors immersed in the bath of liquid and a filter cake forms upon the filter web surfaces which have a series of corrugations formed by the web 53 being in direct contact with the corrugated apertured support members as shown in full lines on Fig. 4. As the sectors are rotated by the shaft unit 4, they leave the liquid bath and proceed through the air toward the discharge station. During the passage, vacuum is still applied and the wet filter cake is partially dried.

At the discharge point, the vacuum is cut off by valve unit 32 and pressure is applied through the same shaft conduit and stem conveying arrangement. This causes the flexible web 53 which is down in the plate corrugations to blow outwardly as shown in dotted lines in Fig. 4 from the face of the plate a considerable amount because of the excess length of cloth following the corrugations and the filter cake discharges very readily without need of scrapers. The discharged filter cake is guided into the collection crenelations 14, by the baffle plates 30.

As each filter sector passes the discharge stage, vacuum is again applied thereto by the valve unit 32 and the cycle is repeated.

As illustrated in Figure 5, the corrugated support members of this invention may also be used in horizontal pan type filters. In this figure, the filter apparatus comprises a ring member 88 carried by horizontal shaft 90 which connects to a vertical central drive shaft (not shown). A fluid-conveying conduit 92 passes through each side of the shaft 90 connecting to fluid collecting chambers 94 formed in the ring member 88. Above each chamber 94, a corrugated screen 96 is held in position within the member 88 by the boss 98, and support bars 99.

In operation of the pan filter, a filter cloth or other porous web of suitable size is placed over the support member 96 and is caused to cover it completely by conforming to the surface configuration thereof. During application of vacuum and formation of the filter cake, the filter web remains in direct contact with the corrugated member presenting a filter surface of much greater area than if the filter web were stretched flat across the ring member 88. When the cake discharge stage is reached, pressure is applied to the undersurafce of the filter web through the conduit 92 and the web is blown away from the corrugated support member causing the filter cake to be discharged.

These new corrugated filter surfaces and the new filter cake discharge methods can be used with pan filters of either the single sided or double sided type. Such modification of pan filters gives very pronounced improvement in filter efficiency and cake discharge as compared with prior pan filters and eliminates one of the main draw-backs of this type of equipment.

The principles of this invention may also be applied to vacuum filters of the drum type as shown in Figure 6. Here, the filter deck 100 carried upon the central shaft 102, in known fashion, supports on its outer surface a corrugated, apertured support member 104, constructed as explained in detail above. In use, a filter cloth is placed directly over the corrugated member and conforms to its configuration. A liquid mixture is then filtered using a vacuum for filter cake formation and blowing for filter cake discharge as discussed above. As in the case of the disc and pan filters, rapid filtering and ease of discharge of the filter cake characterize such new type drum filters.

The new improvements described above may be generally applied to vacuum filters of various types. When filters are modified with the corrugated filter web supporting members discussed in detail, increased filter area and filtering efficiency are obtained for filter apparatus of any given size. At the same time, need for discharge scrapers on the filters is eliminated and critically new and desirable results in filter cake discharge operation are obtained.

It is found that the cake which forms on the corrugated cloth has a certain amount of structural strength; that is, it retains the corrugated shape of the cake during the blow process.

When the filter cloth is blown, and bellows out a considerable distance from the corrugated sector, the cloth forms a continuous convex surface. Since the filter cake retains a corrugated shape, there is lateral movement between the filter cloth surface and the surface of the corrugated filter cake. This lateral movement at the juncture of the cake and the cloth acts to further break the cake loose from the filter cloth.

I claim:

1. In a rotary vacuum filter having cake forming and cake discharge portions in its filtration cycle, a rigid corrugated apertured filter medium support member, the apertures of said member being distributed over its full filter medium supporting area, a flexible permeable filter medium positioned in direct contact with the outer surface of the corrugated support member, said filter medium having a total surface area equal to at least the total filter medium supporting area of the corrugated member, means for creating a zone of low pressure adjacent the inner surfaces of the corrugated member during the cake forming portion of the filtration cycle to provide an undulated filter surface as the filter medium conforms to the surface configuration of the support member, and means for creating a zone of high pressure adjacent the inner surface of the support member during the cake discharge portion of the filtration cycle to cause the filter medium to move away from the corrugated support member, whereby the filter cake formed upon the outer undulated surface of the filter medium is effectively dislodged.

2. In a rotary vacuum filter having cake forming and cake discharge portions in its filtration cycle, a rigid corrugated apertured filter medium support member, the apertures of said member being distributed over its full filter medium supporting area, the diameter of the apertures being substantially the same and less than the distance between a groove and an adjacent land of said corrugated member, a flexible permeable filter medium positioned in direct contact with the outer surface of the corrugated support member, said filter medium having a total surface area equal to at least the total filter medium supporting area of the corrugated member, means for creating a zone of low pressure adjacent the inner surface of the corrugated member during the cake forming portion of the filtration cycle to provide an undulated filter surface as the filter medium conforms to the surface configuration of the support member, and means for creating a zone of high pressure adjacent the inner surface of the support member during the cake discharge portion of the filtration cycle to cause the filter medium to move away from the corrugated support member, whereby the filter cake formed upon the outer undulated surface of the filter medium is effectively dislodged.

References Cited in the file of this patent

UNITED STATES PATENTS

| | | |
|---|---|---|
| 1,036,174 | Barnes | Aug. 20, 1912 |
| 1,214,152 | Genter | Jan. 30, 1917 |
| 1,724,436 | Sweetland | Aug. 13, 1929 |
| 1,940,993 | Borden | Dec. 26, 1933 |
| 2,024,955 | Teatini | Dec. 17, 1935 |
| 2,068,511 | Raisch | Jan. 19, 1937 |
| 2,221,210 | Soderquist | Nov. 12, 1940 |
| 2,351,652 | Anderson | June 20, 1944 |